(12) United States Patent
Sasaki et al.

(10) Patent No.: US 7,779,680 B2
(45) Date of Patent: Aug. 24, 2010

(54) ESTIMATION OF ENGINE-OUT NOX FOR REAL TIME INPUT TO EXHAUST AFTERTREATMENT CONTROLLER

(75) Inventors: Shizuo Sasaki, San Antonio, TX (US); Jayant V. Sarlashkar, San Antonio, TX (US); Gary D. Neely, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 338 days.

(21) Appl. No.: 12/119,218

(22) Filed: May 12, 2008

(65) Prior Publication Data

US 2009/0277259 A1 Nov. 12, 2009

(51) Int. Cl.
*G01M 15/10* (2006.01)
(52) U.S. Cl. .................................................. 73/114.71
(58) Field of Classification Search ................ 73/23.31, 73/114.69, 114.71, 114.73
See application file for complete search history.

(56) References Cited

U.S. PATENT DOCUMENTS

| 6,214,208 | B1 * | 4/2001 | Ando et al. | 205/781 |
| 6,695,964 | B1 * | 2/2004 | Ando et al. | 205/781 |
| 2006/0243040 | A1 * | 11/2006 | Reed et al. | 73/119 R |

* cited by examiner

*Primary Examiner*—Eric S McCall
(74) *Attorney, Agent, or Firm*—Baker Botts LLP

(57) ABSTRACT

A method and system for estimating engine-out NOx from a diesel engine. The estimation is calculated from a mathematical model that expresses engine-out NOx as functions of cylinder pressure, intake oxygen, and effective temperature, respectively. Input data for each of these functions may be obtained from fuel quantity data and from measured data, the latter including intake pressure, cylinder pressure, intake oxygen concentration, coolant temperature, and intake manifold temperature.

15 Claims, 2 Drawing Sheets

ESTIMATION OF ENGINE-OUT NOX FOR REAL TIME INPUT TO EXHAUST AFTERTREATMENT CONTROLLER

TECHNICAL FIELD OF THE INVENTION

This invention relates to reducing exhaust emissions from internal combustion engines, and more particularly to estimating the amount of NOx emissions from a diesel engine.

BACKGROUND OF THE INVENTION

Internal combustion engines are a major contributor to harmful emissions. Internal combustion engines dominate land transportation propulsion—cars, trucks, off-highway vehicles, railroad, marine, motorcycles—as well as provide mechanical and electrical power for a wide range of large and small applications. The two dominant types of internal combustion engines are spark-ignition and diesel. The amount and composition of the emissions exhausted from these engines depend on the details of the processes that occur within the engine during operation, the characteristics of the fuel used, and the type of emissions control system used.

For diesel engines, the main pollutants of concern are nitrogen oxides (NOx) and particulate matter (PM). The latter is composed of black smoke (soot), sulfates generated by the sulfur in fuel, and organic components of unburned fuel and lubricating oil.

To reduce NOx, one approach is the use of NOx reduction catalysts, such as lean NOx traps (LNTs), also referred to as NOx absorber catalysts (NACs). To reduce PM, one approach is the use of various types of diesel particulate filters (DPFs). These devices may be used alone or together, with either or both being used downstream of the engine, in the exhaust line. Both operate in repeated loading and regeneration cycles.

A characteristic of Nox reduction catalysts is that they accumulate NOx and must be periodically regenerated. For regeneration, the oxygen content in the exhaust is reduced. This reduced oxygen content is usually combined with increased exhaust hydrocarbon content, to obtain a rich mixture needed for the NOx regeneration process.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a system and method, used in conjunction with an EGR-equipped diesel engine, for estimating engine-out NOx emissions. The NOx is estimated from the following parameters: 1) engine speed, 2) fuel injection quantity, 3) cylinder pressure, 4) intake O2 concentration, and 5) an "effective" temperature, based on coolant and intake manifold temperatures.

In practice, one application of the system and method is to relate the engine-out NOx to the amount of NOx accumulated in an exhaust after treatment device, such as a NOx reduction device in the exhaust line downstream of the engine. If the accumulated NOx can be estimated, it can then be determined whether the NOx reduction device needs regeneration.

Figure 1:
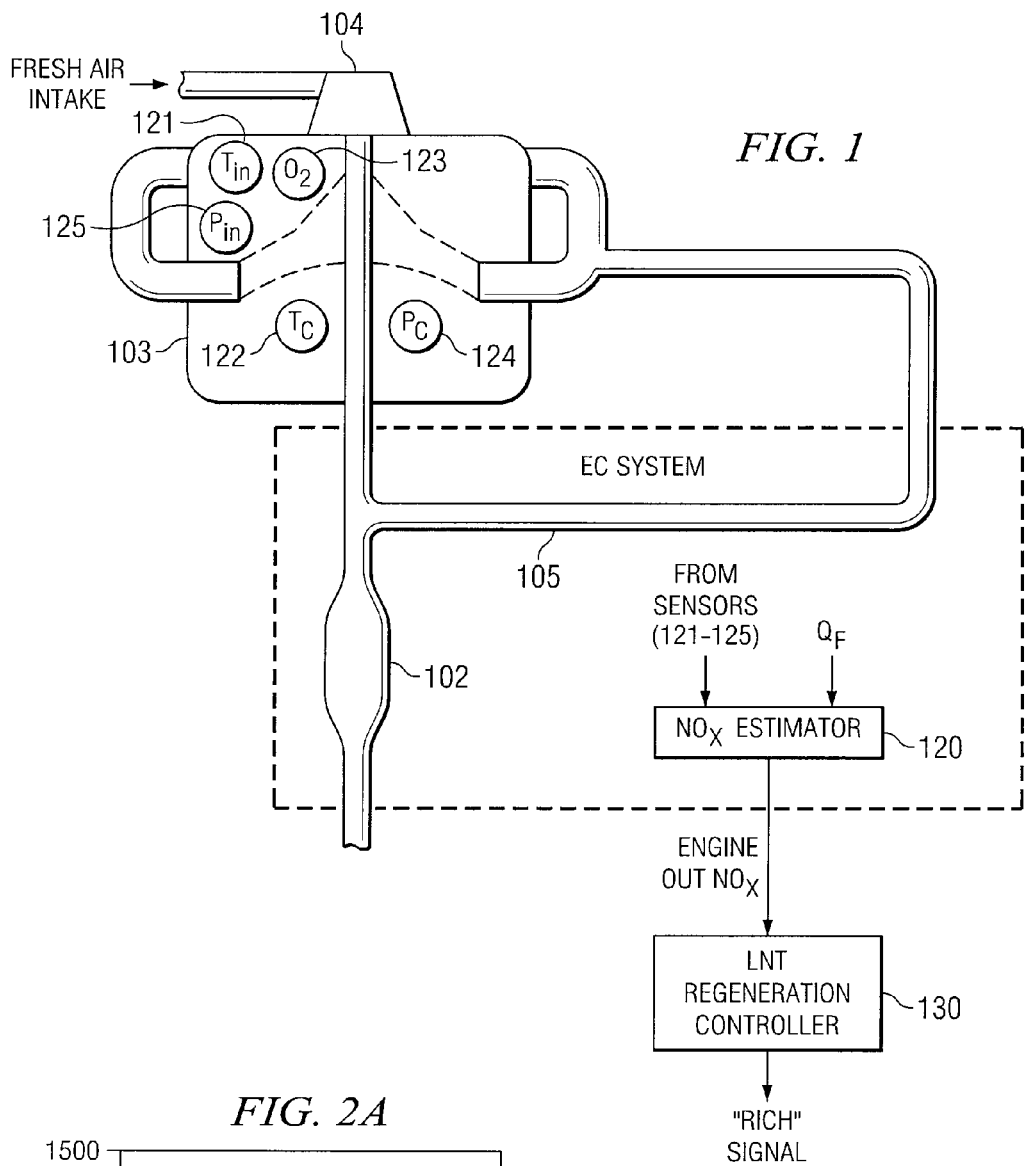
FIG. 1 illustrates an EGR-equipped diesel engine having a system for estimating engine-out NOx.

FIG. 1 illustrates a diesel engine 103 having a NOx estimation unit 120 for estimating engine-out NOx. Engine 103 is also equipped with an air-charging device 104, such as a turbocharger, and an EGR (exhaust gas recirculation) loop 105.

As explained below in connection with FIGS. 2-4, NOx estimation unit 120 receives various inputs and generates a value representing an estimation of engine-out NOx. As explained below, this value is calculated dynamically as the engine operates. This value is suitable for use in a production engine as data input to a real time controller, such as a controller for controlling regeneration of a NOx reduction device.

The exhaust system of engine 103 also has at least one exhaust after treatment device 102 that reduces NOx emissions. In the example of this description, the after treatment device 102 is an LNT (lean NOx trap) sometimes also referred to as a NAC (NOx absorber catalyst).

As illustrated, LNT 102 is mounted along the engine exhaust pipe. LNT 102 is essentially a storage device for NOx contained in the exhaust gas. It has two principal elements: a NOx adsorbent and a three-way conversion catalyst. LNT 102 has three primary functions: conversion of NO to $NO_2$, adsorption of $NO_2$, and release and reduction of $NO_2$ during regeneration of the LNT 102.

As stated in the Background, regeneration of LNT 102 is performed under rich exhaust gas conditions. During regeneration, stored NOx is released from the adsorbent and simultaneously reduced to $N_2$ (and/or $N_2O$ or $NH_3$) over precious metal sites.

In the example of FIG. 1, the EGR loop 105 is a "high-pressure EGR" loop, which re-circulates exhaust between two high pressure points (the exhaust manifold and the inlet manifold). The method described herein is also useful for engines having "low-pressure EGR" loops, which re-circulate exhaust between two low pressure points (the exhaust system tail pipe and the turbocharger inlet).

When part of the exhaust gases is re-circulated to the intake air, the oxygen content is decreased and the heat capacity is increased resulting in lower peak combustion temperature and less nitrogen monoxide formation. However, a decrease in oxygen content causes an increase in the amount of particulate matter (PM) produced. Therefore, it is important to control the EGR rate at various engine operating conditions.

One aspect of the invention is the selection of factors that play a significant role in determining the amount of engine-out NOx at any given time during engine operation. These factors include the engine heat release rate, the EGR rate, and an "effective" temperature. These factors are each mathematically modeled and used as inputs to a NOx estimation algorithm so that a mathematical calculation can be used to estimate engine-out NOx.

Figure 2A:
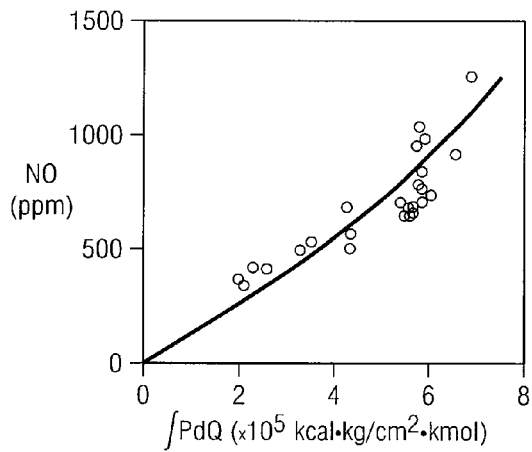
FIGS. 2A and 2B illustrate the relationship between NOx emissions and the engine heat release rate weighted by cylinder pressure, for two engine operating conditions.
Figure 2B:
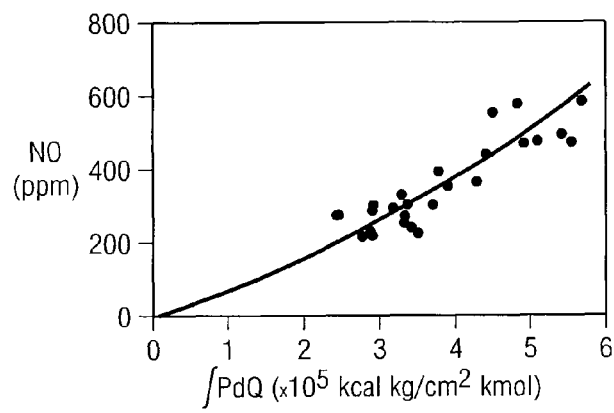

FIGS. 2A and 2B illustrate NOx emissions as a function of the first factor, the heat release rate, weighted by cylinder pressure. The x-axis is an integral of PdQ. The heat release rate is expressed as a function of cylinder pressure, that is, as F(P).

FIG. 2A illustrates an engine having direct injection at 1200 rpm. FIG. 2B illustrates an engine having indirect injection at 2000 rpm. As illustrated, for both operating conditions, the amount of Nox emissions increases with an increasing heat release rate.

The second factor, the EGR rate, may be expressed as a function of oxygen in the intake manifold, F(O2). This oxygen is directly related to the EGR rate. With an increasing amount of EGR, the O2 concentration in the combustion portion of the air-fuel mix is reduced, combustion temperature is reduced and NOx formation speed is reduced.

The third factor, effective temperature, is also a function, F(T), and is a combination of intake temperature and coolant temperature. The effective temperature affects combustion temperature, and thus affects NOx formation.

From the above-described three functions, an engine-out NOx estimation model for estimating engine-out NOx emission may be expressed as follows:

$$NOx = F(T) \times F(O2) \times F(P) \tag{1}$$

where F(T) is a function of effective temperature, F(O2) is a function of O2 concentration in the intake manifold, and F(P) is a function of cylinder pressure at the combustion period.

Referring again to FIGS. 2A and 2B, F(P) can be expressed as follows:

$$F(P) = k \int (P(\theta)/P_{in})^\alpha dQ/d\theta$$
$$= k P^\alpha \int dQ/d\theta$$

The integrated value of dQ/dθ should be the same (or very similar) to the fuel quantity (assuming complete combustion). Thus, $$F(P) = k P^\alpha Q_f \tag{2}$$

where:
- $Q_f$: fuel quantity
- $P(\theta)$: cylinder pressure (θ; crank angle)
- $P_{in}$: intake (boost pressure)
- α: constant
- k: constant (includes the effect of incomplete combustion and heat loss)

P is a non-dimensional parameter, which together with the constants k and α, define the effect of the heat release pattern on NOx formation.

Figure 3:
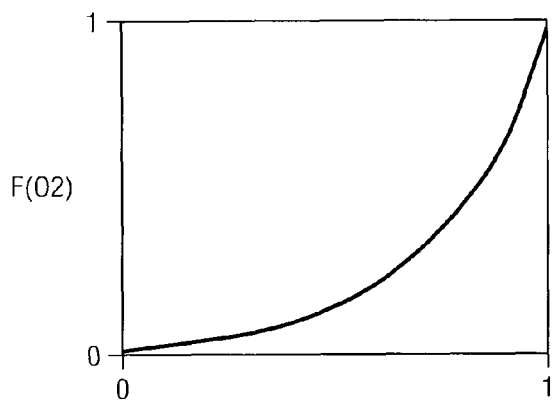
FIG. 3 illustrates F(O2), the O2 concentration at the intake manifold, as a non dimensional function.

As illustrated in FIG. 3, F(O2) can be expressed in terms of a ratio of oxygen (O2) to air at the intake. In FIG. 3, the x-axis is the normalized mass concentration of oxygen, and the y-axis is a non dimensional function of this value.

When EGR is 0%, the O2 concentration is about 21% (volume %) or 0.233 (weight ratio). Using the weight ratio, F(O2) may be expressed as:

$$F(O2) = F(O2/0.233) \tag{3}$$

Values for F(O2) range from 0 to 1 and are non-dimensional. F(O2) defines the effect of oxygen concentration of inducted air with EGR.

Figure 4:
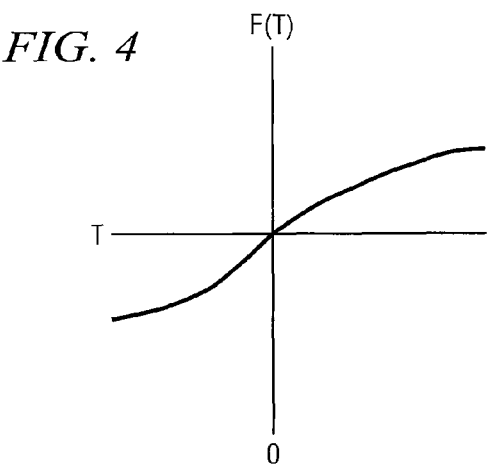
FIG. 4 illustrates F(T), effective temperature, as a function of coolant temperature and intake manifold temperature.

FIG. 4 illustrates F(T), the effective temperature, in terms of coolant temperature and intake manifold temperature, expressed as a single value T:

$$T = a(T_c - 90) + b(T_i - T_{i\,ss})$$

where,
- $T_c$: coolant temperature
- $T_i$: intake manifold temperature
- $T_{i\,ss}$: intake manifold temperature at standard condition
- a, b: constant Thus, $$F(T) = F(a(T_c - 90) + b(T_i - T_{i\,ss})) \tag{4}$$

F(t) is an empirical function and also non-dimensional. It defines the effect of coolant and intake manifold temperature on engine-out NOx.

From Equations (2), (3) and (4), a function for estimating NOx can be expressed as the following non-dimensional function:

$$NOx = F(T) \times F(O2) \times F(P) \tag{5}$$
$$= k P^\alpha Q_f \times F(T) \times F(O2)$$
$$NOx/Q_f = k P^\alpha \times F(T) \times F(O2)$$

In this manner, engine-out NOx is estimated from fuel quantity, cylinder pressure, intake pressure, intake oxygen concentration, and effective temperature.

Referring again to FIG. 1, engine 103 is equipped with various sensors for measuring the inputs to F(T). Temperature sensors 121 and 122 measure intake and coolant temperature, respectively. Oxygen sensor 123 measures the intake oxygen. Pressure sensors 124 and 125 measure cylinder and intake pressure, respectively.

The fuel quantity input, $Q_f$ is determined by fuel quantity per engine cycle. This data may be provided in the form of a fuel quantity command, which is already calculated by a fuel injection controller (not shown) of engine 103. Typically, the fuel quantity is determined from current engine operating conditions, such as engine speed and in-cylinder O2 mass, which themselves are determined by intake airflow mass and accelerator pedal position. Various algorithms and techniques are known in the art of internal combustion engines for determining $Q_f$, and often use mapping techniques with appropriate processing and memory devices.

The fuel quantity value, $Q_f$, may be calculated for both steady and transient operating conditions. Likewise, the various additional inputs to NOx estimation unit 120 may be measured and delivered to NOx estimation unit 120 for real time engine-out NOx estimation under various operating conditions of engine 103.

NOx estimation unit 120 receives these inputs and in accordance with the above-described method, estimates engine-out NOx. NOx estimation unit 120 is implemented with appropriate processing and memory devices, programmed in accordance with the method described herein. It may include appropriate processing devices for receiving and converting measurement data to digital form. As stated above, it may deliver its output, estimated engine-out NOx data, to some other controller, such as a controller for determining regeneration of NAC 102.

Referring again to FIG. 1, in the example of this description, Nox estimation unit 120 delivers real-time data output to an LNT regeneration controller 130. From this data, controller 130 estimates whether LNT 102 requires regeneration and delivers appropriate signals to cause rich operating conditions as desired for periodic regeneration.

What is claimed is:
1. A method, for use in a diesel engine, of estimating the amount of engine-out Nox, comprising:

receiving a fuel quantity value representing the current fuel quantity delivered to the engine;

measuring the following engine conditions: cylinder pressure, intake pressure, intake oxygen concentration, and effective temperature;

wherein effective temperature is based on at least one of coolant temperature and intake manifold temperature; and calculating a value representing engine-out Nox, using the fuel quantity value and the values obtained in the measuring step.

2. The method of claim 1, wherein the calculating step is performed by calculating the product of the following three functions: F(P), F(O2), and F(T), which are functions of the cylinder pressure, intake oxygen, and effective temperature, respectively.

3. The method of claim 2, wherein F(P) is calculated from the fuel quantity value and the ratio of cylinder pressure to intake pressure.

4. The method of claim 2, wherein F(P) is calculated as: $k(P(\theta)/P_{in})^\alpha Q_f$, where k and $\alpha$ are constants, $P(\theta)$ is cylinder pressure, $P_{in}$ is intake pressure, and $Q_f$ is fuel quantity.

5. The method of claim 2, wherein F(O2) is calculated from the ratio of intake oxygen to intake air.

6. The method of claim 2, wherein F(T) is calculated from coolant temperature and intake manifold temperature.

7. The method of claim 2, wherein F(T) is calculated as: $a(T_c-90)+b(T_i-T_{i\,ss})$, where, $T_c$ is coolant temperature, $T_i$ is intake manifold temperature, $T_{i\,ss}$ is intake manifold temperature at standard condition, and a and b are constants.

8. The method of claim 1, wherein the fuel quantity value is received from a fuel injection controller.

9. A method, for use in a diesel engine having a Nox reduction device, of determining when to regenerate the Nox reduction device, comprising:

receiving a fuel quantity value representing the current fuel quantity delivered to the engine;

measuring the following engine conditions: cylinder pressure, intake pressure, intake oxygen concentration, and effective temperature;

wherein effective temperature is based on at least one of coolant temperature and intake manifold temperature; and calculating a value representing engine-out Nox, using the fuel quantity value and the values obtained in the measuring step; and using the engine-out Nox to determine the amount of NOx accumulated in the Nox reduction device.

10. A system for use in a diesel engine, for estimating the amount of engine-out Nox, comprising:

a NOx estimation unit programmed to receive a fuel quantity value representing the current fuel quantity delivered to the engine, and to receive measurements of the following engine conditions: cylinder pressure, intake pressure, intake oxygen concentration, and effective temperature;

wherein effective temperature is based on at least one of coolant temperature and intake manifold temperature; and wherein the NOx estimation unit is further programmed to calculate a value representing engine-out Nox, using the fuel quantity value and the values obtained in the measuring step.

11. The system of claim 10, wherein the NOx estimation unit is further programmed to deliver data representing engine-out NOx to a controller for controlling regeneration of a NOx reduction device.

12. The system of claim 10, wherein the NOx estimation unit calculates the engine-out NOx by calculating the product of the following three functions: F(P), F(O2), and F(T), which are functions of the cylinder pressure, intake oxygen, and effective temperature, respectively.

13. The system of claim 12, wherein F(P) is determined from cylinder pressure and intake pressure.

14. The system of claim 12, wherein F(O2) is determined from the ratio of intake oxygen to intake air.

15. The system of claim 12, wherein F(T) is determined from the coolant temperature and the intake manifold temperature.

* * * * *